US006653559B2

(12) United States Patent
Chirumbolo

(10) Patent No.: US 6,653,559 B2
(45) Date of Patent: Nov. 25, 2003

(54) COMPLEX-SHAPED TERMINAL BOARD, IN PARTICULAR FOR HIGH-CURRENT APPLICATIONS

(75) Inventor: Dino Chirumbolo, Settimo Torinese (IT)

(73) Assignee: ITW Industrial Components S.r.l., Milan (IT)

( * ) Notice: Subject to any disclaimer, the term of this patent is extended or adjusted under 35 U.S.C. 154(b) by 0 days.

(21) Appl. No.: 10/139,641

(22) Filed: May 7, 2002

(65) Prior Publication Data

US 2003/0008556 A1 Jan. 9, 2003

(30) Foreign Application Priority Data

May 8, 2001 (IT) .................................... MI2001A0939

(51) Int. Cl.[7] .................................................. H02G 3/08

(52) U.S. Cl. ............................. 174/50; 174/58; 174/63; 220/4.02

(58) Field of Search ............................. 174/50, 58, 63, 174/17 R, 60, 64; 220/4.02, 3.6, 3.8; 248/906; 439/535; 361/600

(56) References Cited

U.S. PATENT DOCUMENTS 6,410,849 B1 * 6/2002 Okabe et al. ................. 174/50
6,418,036 B1 * 7/2002 Rodrigues ................... 361/816
6,498,293 B2 * 12/2002 Marchand et al. ............ 174/50
6,515,227 B1 * 2/2003 Massey et al. ................ 174/50
6,545,217 B2 * 4/2003 Sato ............................ 174/50
6,600,658 B2 * 7/2003 Iwata ......................... 361/752

* cited by examiner

*Primary Examiner*—Dhiru R. Patel
(74) *Attorney, Agent, or Firm*—Lowe Hauptman Gilman & Berner LLP

(57) ABSTRACT

A complex-shaped terminal board having at least one supporting member of dielectric material; and an electric circuit having a number of co-molded tracks embedded in the supporting member, substantially in a single molding plane. The supporting member has a number of supporting portions connected to one another by exposed portions of the tracks, which form plastic hinges between respective pairs of supporting portions, and which are bendable to bring the supporting portions into predetermined relative positions in which they form dihedral angles with respect to one another.

6 Claims, 2 Drawing Sheets

COMPLEX-SHAPED TERMINAL BOARD, IN PARTICULAR FOR HIGH-CURRENT APPLICATIONS

The present invention relates to a complex-shaped terminal board, in particular for high-current applications.

BACKGROUND OF THE INVENTION

As is known, many devices, both industrial and non-industrial, require special terminal boards, particularly high-current devices and when user adjustment of the operating mode of the device is required. For example, a compressor may comprise an electric motor supplying user-adjustable power according to the type of application involved. More specifically, energy-saving or overload operating modes may be implemented for a limited period of time, in which case, service terminals must be provided to transmit user-selected commands to, and so modify the operating mode of, the electric motor of the compressor.

Known terminal boards comprise an electric circuit defined by a number of conducting tracks; and a body of dielectric material, in which the tracks are embedded, and which electrically insulates the tracks from one another and also acts as a support.

The conducting tracks have a number of ends, which provide, for example, for forming contacts with supply terminals of the user device (electric motor of the compressor) and standard multiway connectors.

Terminal boards are provided with clamping screws and respective nuts for electric connection to the cables of an external, e.g. mains, supply line, so that each cable is clamped between a screw and nut, and is connected electrically and mechanically to the terminal board.

Known terminal boards have various drawbacks: to form the necessary terminals and connectors, and at the same reduce the overall size of the terminal board, the tracks are bent so that respective portions lie in different planes. As a result, the body of dielectric material, in which the conducting tracks are embedded, is of complex shape (e.g. a box body), and co-molding of the body and tracks is made difficult.

Assembling the clamping screws may also pose problems, by the nuts having to be inserted inside the box body. Alternatively, the clamping screws and nuts may be fixed to ends of the conducting tracks projecting outside the box body; in which case, however, the screws and nuts may easily become detached and lost.

SUMMARY OF THE INVENTION

It is an object of the present invention to provide a terminal board designed to eliminate the aforementioned drawbacks, and which is also cheap and easy to produce.

According to the present invention, there is provided a complex-shaped terminal board comprising at least one supporting member of dielectric material; and an electric circuit having a number of co-molded tracks embedded in said supporting member, substantially in a single molding plane; characterized in that said supporting member comprises a number of supporting portions connected to one another by exposed portions of said tracks; said exposed portions of said tracks forming plastic hinges between respective pairs of said supporting portions, and being bendable to bring said supporting portions into predetermined relative positions in which they form dihedral angles with respect to one another.

The supporting member and the circuit may thus be co-molded easily in one plane; and, by bending the exposed portions of the tracks, the supporting portions defining the supporting member can be brought into predetermined relative positions to obtain a terminal board of predetermined complex shape.

According to a further aspect of the invention, at least three of said supporting portions are arranged to form a box body supporting electric-connecting and fastening means for connecting at least some of said tracks to respective cables of a supply line.

Moreover, said electric-connecting and fastening means are located at least partly inside a cavity defined in said box body, and provide for clamping said cables of said supply line.

The electric-connecting and fastening means are therefore retained inside the box body, and can be seated before the exposed portions of the tracks are bent, thus simplifying assembly.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
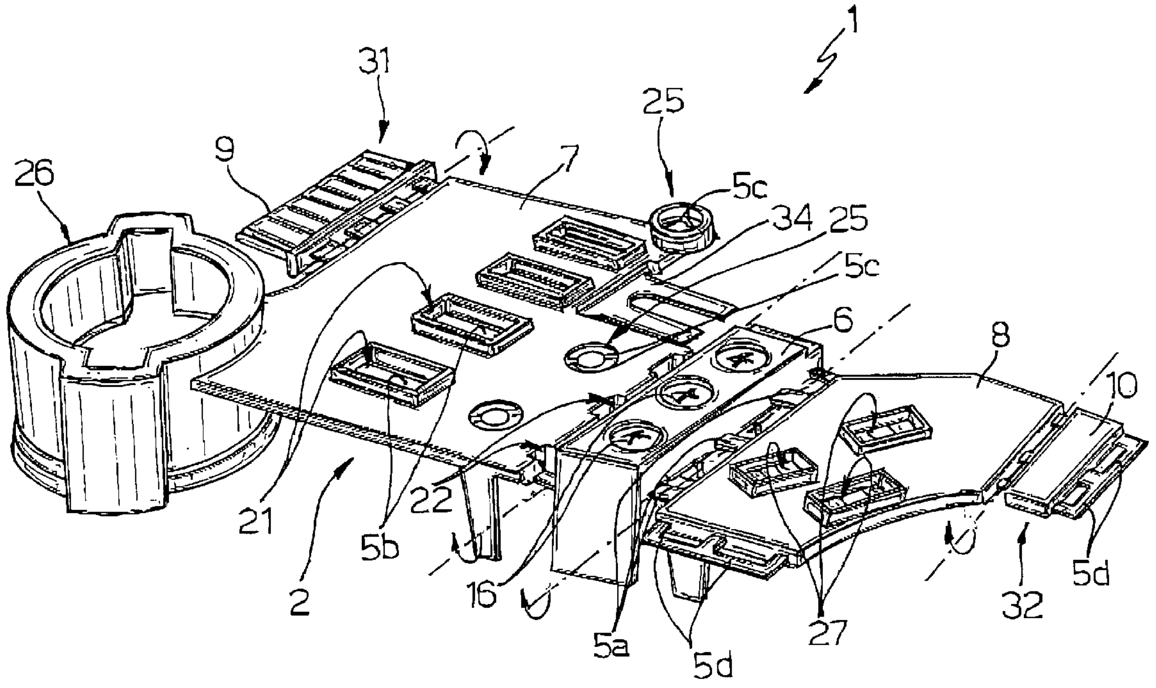
FIG. 1 shows a view in perspective of a terminal board in accordance with a first embodiment of the present invention, and in the as-molded configuration.
Figure 2:
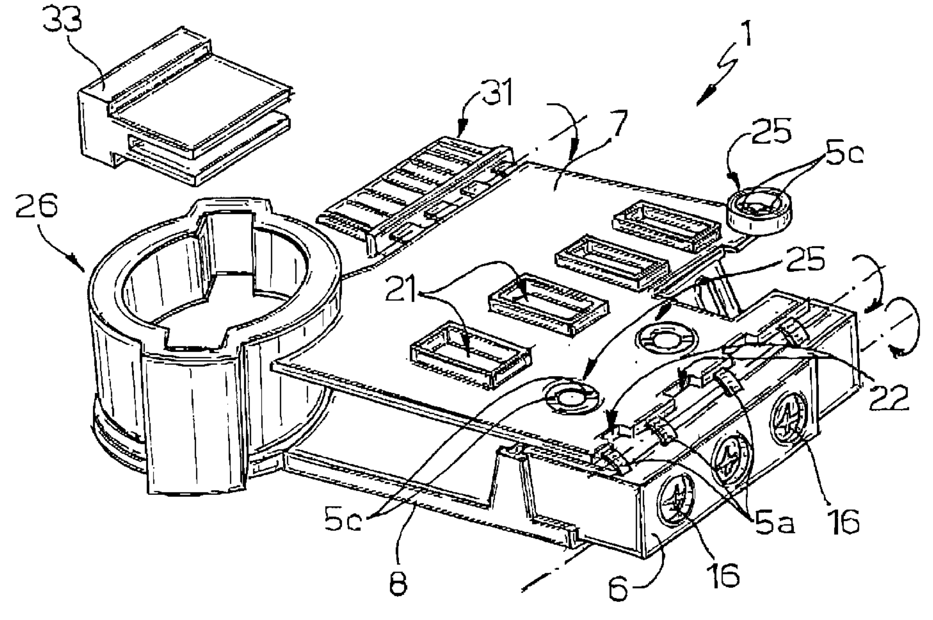
FIG. 2 shows a view in perspective of the FIG. 1 terminal board in the as-used configuration.
Figure 3:
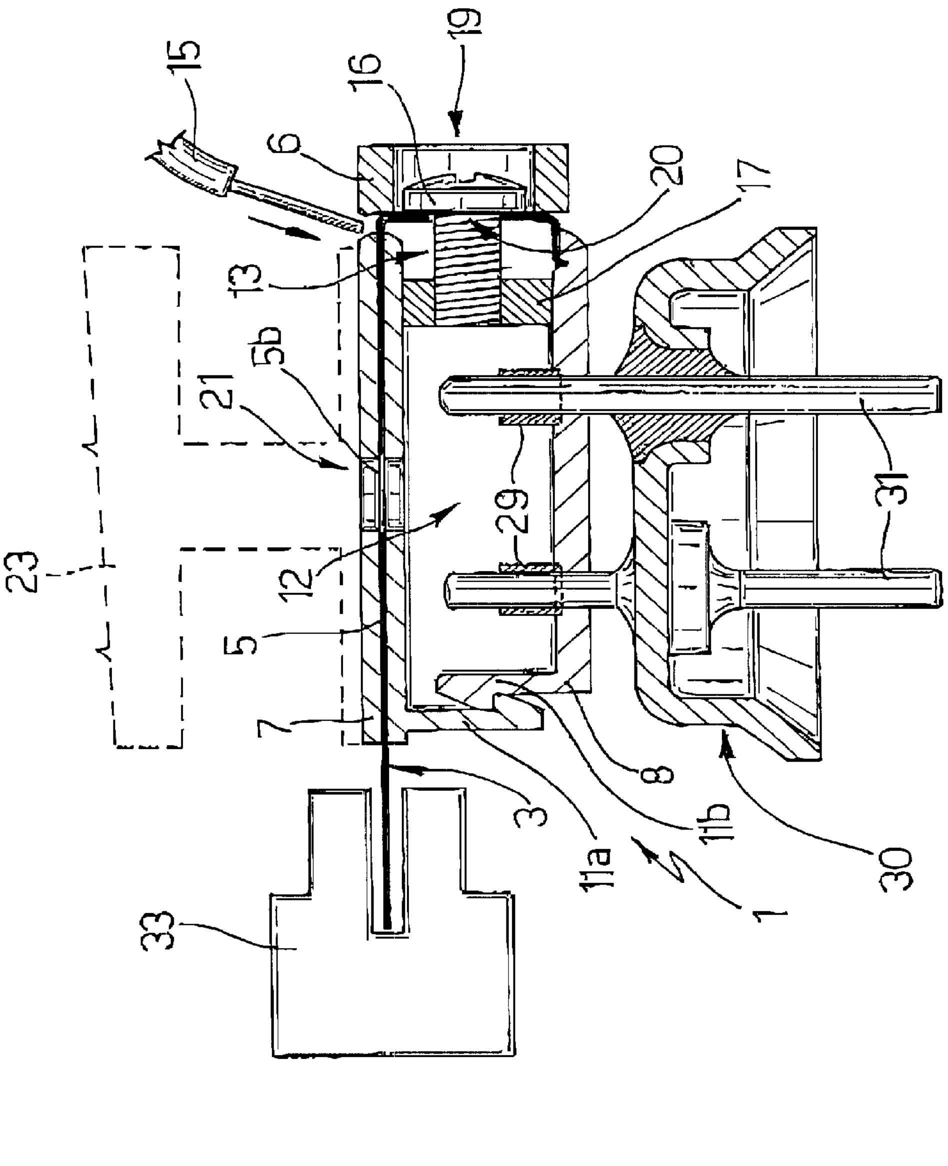
FIG. 3 shows a longitudinally sectioned side view of the FIG. 1 terminal board.

With reference to FIGS. 1–3, a complex-shaped terminal board, indicated as a whole by 1, comprises at least one supporting member 2 of dielectric material; and an electric circuit 3 having a number of tracks 5 embedded in supporting member 2.

Supporting member 2 comprises a number of supporting portions, including at least one base 6, a first and second plate 7, 8, and a first and second connector support 9, 10; which portions are connected to one another by respective exposed portions **5*a* of tracks 5, with base 6 interposed between first and second plate 7, 8**.

As shown in FIG. 1, supporting member 2 and tracks 5 are co-molded substantially in one molding plane; and the exposed portions **5*a* of tracks 5—which act as plastic hinges between base 6 and first and second plate 7, 8 on either side—are then bent (FIG. 2) substantially squarely to bring base 6 and first and second plate 7, 8 into predetermined relative positions in which they form dihedral angles with respect to one another. In other words, when supporting member 2 is in the as-used configuration, base 6 and first and second plate 7, 8 form a box body defining an inner cavity 12, housing electric connecting means 13 for connecting at least some of tracks 5 to respective cables 15 of a supply line. First and second plate 7, 8 have respective click-on fastening members 11*a*, 11*b* for retaining supporting member 2** in the as-used configuration.

Connecting means 13 preferably comprise a number of screws 16 and respective nuts 17. Before exposed portions

5a of tracks 5 are bent, screws 16 are inserted inside cavity 12 through respective through seats 19 formed in base 6, and through respective holes 20 formed in tracks 5 (so that screws 16 are connected electrically to respective tracks 5).

Screws 16 are then fitted with respective nuts 17, which are enclosed inside cavity 12 when base 6 and first and second plate 7, 8 are set to their predetermined relative positions, so that each nut 17 slides along its axis A and is locked angularly between first and second plate 7, 8 facing each other. By turning screws 16, therefore, respective nuts 17 can be slid along respective axes A inside cavity 12 to alternatively insert cables 15 and clamp cables 15 against respective tracks 5, so that electric connecting means 13 provide for also mechanically fastening cables 15.

To assist insertion of cables 15, first plate 7 has a number of gaps 22 adjacent to exposed portions 5a of tracks 5 connecting first plate 7 to base 6.

First plate 7 also comprises first openings 21; windows 25; and a housing 26 for a known thermal cut-out device (not shown). First openings 21 are formed at respective connecting portions 5b of tracks 5, which are made accessible to connect terminal board 1 electrically to a modular connector body 23 (shown by the dash line in FIG. 3); while windows 25 are formed to expose inner supporting portions 5c of tracks 5, which provide for positioning tracks 5 correctly during molding and must later be cut.

Second plate 8 has second openings 27 formed at supply contacts 29 formed along respective tracks 5. When terminal board 1 is fitted to a user device 30, e.g. an electric motor of a compressor (shown only partly and schematically in FIG. 3), supply contacts 29 are connected to respective connecting pins 31 through second openings 27, thus connecting user device 30 electrically to cables 15 of the supply line.

FIG. 1 shows a first and a second connector 31, 32; and outer supporting portions 5d of tracks 5, which are cut, together with inner supporting portions 5c, before bending exposed portions 5a.

First and second connector 31, 32—both male types—comprise respective groups of tracks 5 carried by first and second connector support 9, 10 respectively, and are connected to respective female connectors 33 (only one shown in FIGS. 2 and 3).

Finally, one of tracks 5—connected by a screw 16 and nut 17 to a ground cable (not shown)—has a U-shaped end 34 for grounding user device 30 in known manner not shown.

Figure 4:
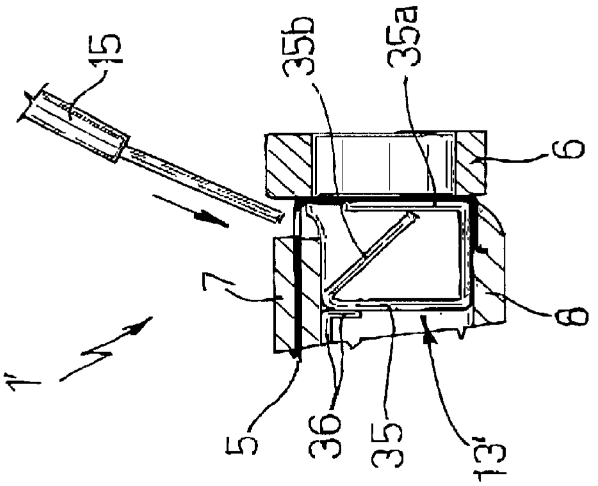
FIG. 4 shows a longitudinally sectioned side view of a terminal board in accordance with a further embodiment of the present invention.

With reference to FIG. 4, in a further embodiment of the invention, a terminal board 1' comprises electric connecting means 13' having at least one substantially C-shaped blade 35. Blade 35 is inserted inside cavity 12, is retained inside the cavity, between a projection 36 and a respective track 5, and has a base 35a, and an elastic contrasting tab 35b resting against base 35a. More specifically, elastic tab 35b flexes to permit insertion of a cable 15, which is then fastened against base 35b.

Clearly, changes may be made to the terminal board as described herein without, however, departing from the scope of the present invention.

What is claimed is:

1. A complex-shaped terminal board comprising at least one supporting member (2) of dielectric material; and an electric circuit (3) having a number of co-molded tracks (5) embedded in said supporting member (2), substantially in a single molding plane; characterized in that said supporting member (2) comprises a number of supporting portions (6, 7, 8) connected to one another by exposed portions (5a) of said tracks (5); said exposed portions (5a) of said tracks (5) forming plastic hinges between respective pairs of said supporting portions (6, 7, 8), and being bendable to bring said supporting portions (6, 7, 8) into predetermined relative positions in which they form dihedral angles with respect to one another.

2. A terminal board as claimed in claim 1, characterized in that at least three of said supporting portions (6, 7, 8) of dielectric material are arranged to form a box body supporting electric-connecting and fastening means (13; 13') for connecting at least some of said tracks (5) to respective cables (15) of a supply line.

3. A terminal board as claimed in claim 2, characterized in that said electric-connecting and fastening means (13; 13') are located at least partly inside a cavity (12) defined in said box body, and provide for clamping said cables (15) of said supply line.

4. A terminal board as claimed in claim 3, characterized in that said electric-connecting and fastening means (13; 13') comprise at least one screw (16) fitted with a respective nut (17); said nut (17) being located inside said cavity (12), being slidable along its own axis (A), and being locked angularly between a first and a second of said supporting portions (7, 8) of dielectric material facing each other; said screw (16) being connected electrically to a respective one of said tracks (5), and being turnable to slide said nut (17) and clamp a respective cable (15) of said supply line.

5. A terminal board as claimed in claim 3, characterized in that said electric-connecting and fastening means (13; 13') comprise at least one substantially C-shaped blade (35) inserted inside said cavity (12); said blade (35) having a base (35a), and an elastic contrasting tab (35b) resting against said base (35a) and for retaining a respective said cable (15) of said supply line.

6. A terminal board as claimed in claim 1, characterized in that said tracks (5) comprise respective connecting portions (5b) for electric connection to a modular connector member (23), said connecting portions (5b) being accessible by means of respective first openings (21) formed in said supporting member (2); and in that said tracks (5) form respective supply contacts (29) connectable to respective connecting pins (31) of a user device (30).

* * * * *